United States Patent
Fujitani

(10) Patent No.: US 7,148,981 B2
(45) Date of Patent: Dec. 12, 2006

(54) PRINTING APPARATUS CONNECTED TO POCKET ELECTRONIC DEVICE THROUGH NETWORK AND PRINTING SYSTEM THEREOF

(75) Inventor: Satoshi Fujitani, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 981 days.

(21) Appl. No.: 09/947,516

(22) Filed: Sep. 7, 2001

(65) Prior Publication Data

US 2002/0036795 A1    Mar. 28, 2002

(30) Foreign Application Priority Data

Sep. 11, 2000    (JP)    ............................. 2000-274834

(51) Int. Cl.
    *G06K 15/00*    (2006.01)
(52) U.S. Cl. ............... 358/1.15; 358/1.13; 358/1.18
(58) Field of Classification Search ............... 358/1.15, 358/1.13, 1.18, 3.28, 434, 438
    See application file for complete search history.

(56) References Cited

U.S. PATENT DOCUMENTS

| | | | |
|---|---|---|---|
| 5,948,040 A * | 9/1999 | DeLorme et al. | 701/201 |
| 6,230,189 B1 * | 5/2001 | Sato et al. | 709/206 |
| 7,006,241 B1 * | 2/2006 | Yamamoto | 358/1.15 |

FOREIGN PATENT DOCUMENTS

JP    10-222527    8/1998

* cited by examiner

*Primary Examiner*—Joseph R. Pokrzywa
(74) *Attorney, Agent, or Firm*—Oblon, Spivak, McClelland, Maier & Neustadt, P.C.

(57) ABSTRACT

Electric device related information including information which the pocket electric device has and information at a position of a pocket electric device on a network obtained based on information of the position on the network which the pocket electric device has is printed out. Individual identification information that the pocket electric device has as internal information thereof is added to the electric device related information before it is printed out.

16 Claims, 9 Drawing Sheets

| INSTALLATION PLACE | SIDE OF REGISTER |
| ADDRESS | 1-2-3, YY-CHO, XX-KU, TOKYO-TO |
| NAME OF STORE | ABD CONVENIENCE STORE |
| DATE / TIME | 4:30 PM, AUGUST 29, 2000 |

SEVERAL E-MAILS

SEVERAL TELEPHONE DIRECTORIES

| OWN PHONE NUMBER | 090-xxxx-yyyy |
| OWN MAIL ADDRESS | xxx@yyy.zzz. |
| NAME OF OWNER OF PHONE | TARO RIKO |

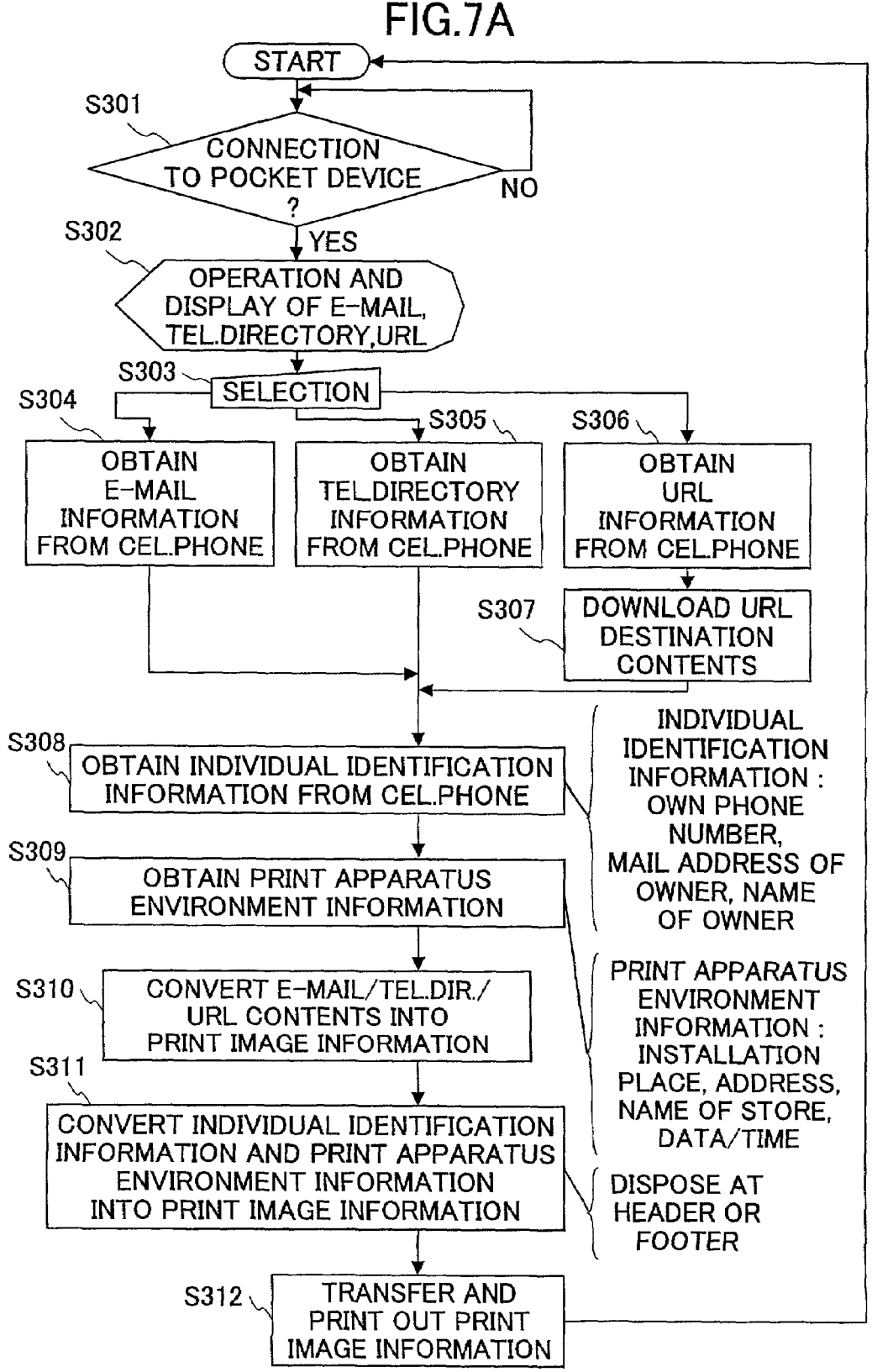

PRINTING APPARATUS CONNECTED TO POCKET ELECTRONIC DEVICE THROUGH NETWORK AND PRINTING SYSTEM THEREOF

BACKGROUND OF THE INVENTION

1. Field of the Invention

The present invention generally relates to a printing apparatus and a printing system, and, in particular, to a printing apparatus and a printing system by which the printing apparatus and a pocket electronic device are connected through a network such as a local network or the Internet, and, by which information transferred from the pocket electric device can be freely added to information originally provided in the printing apparatus, and the thus-obtained information can be printed out together.

2. Description of the Related Art

A pocket electric device represented by a cellular phone is becoming very common. Unlike an old PC (personal computer), it is very easy to use a pocket electric device instead of making it specialize in the use of a single purpose. As a kind of a pocket electric device, there are a cellular phone, a PDA (personal digital assistance), etc., and it has information on a telephone, schedule management, an address book, a telephone directory, etc. Furthermore, the correspondence to the Internet is seen as a recent trend of these pocket electric devices. For example, by e-mail, main communication can be made with persons in the world at real time, and it can be carried out now anywhere, and the Internet information can be directly searched with a Web browser, or data can be pulled thereout directly.

As a specific example, Japanese Laid-Open Patent Application No. 10-222527 discloses the following system:

As an information output system which can output searched data which a user of a pocket electric device (Personal Digital Assistant equipment) obtains through search from a service center at a user-specified place. Specifically, for example, by using the personal digital assistant apparatus, search output demand information by which an object to be searched for and a data output place are specified is transferred to the service center. In the service center, the information output system carries out transfer of an output of the target data obtained through search from a database etc., based on a search request specified by the received search output demand information, by the service center, and the target information is output to the specified data output place.

Now, communication-of-information function of such a pocket electric device is improved, and even the online shopping currently offered on the Internet, ticket arrangement, and bank transfer can be performed through the pocket electric device.

Although the pocket electric device is used as above very convenient information input-and-output means, there is a problem that printing means for it is not offered in the pocket electric device used now. Software (printer driver) for using a printer is not loaded therein, while portability thereof is considered as important, because the pocket electric device is specialized for a single purposes. As a result, a hardware used for linking the device to a printer is not provided in the device, such as a connector, for example. This means that a printer cannot be operated by the pocket electric device.

Moreover, for the pocket electric device, as a result of considering portability as important, generally only a small operation panel is equipped. Although especially a demand of wanting to surely leave and put output information at hand in paper, or to see the information currently referred to on a large-scale display panel is strong, it is unthinkable for a user to purchase a special printer as expensive as several tens of times of the pocket electric device itself, since the pocket electric device is inherently very inexpensive.

By the way, digitization is almost completed now and a copy machine introduced into a convenience store or a general office is an MPF (multi-function peripheral), and it has a function of printing out data obtained from a PC or the other, in many cases. Furthermore, network connection is made with it, and it is shared in many cases on an intranet now.

SUMMARY OF THE INVENTION

Then, a purpose of the present invention is connecting a pocket electric device with an MFP installed in such a convenience store or an office, so as to configure a printing system, and enabling it to perform printing by the system.

According to the present invention, individual identification information which a pocket electric device holds, and/or environment information of a printing apparatus can be added to e-main information, telephone directory information held by the pocket electric device, and/or, further, information downloaded and obtained through a network such as the Internet, and, then, the thus-obtained total information is printed out together at a time.

A printing apparatus according to the present invention, which can be connected with a pocket electric device through a network, includes a printing part printing out electric device related information including information which the pocket electric device has and information at a position on the network obtained based on information of the position on the network which the pocket electric device has, wherein the printing apparatus adds individual identification information that the pocket electric device has built therein as internal information thereof to the above-mentioned electric device related information, and prints thereout.

Thereby, since the individual identification information which the pocket electric device of a customer of a store, for example, has built therein as the internal information thereof is added to other information which the pocket electric device (cellular phone) has, and is printed out by the printing apparatus which is installed in the store for example, it can be easily determined whether the printed matter (printing result) is information of the above-mentioned customer, and when many customers print out their information at the same store, they can easily distinguish which printed matters are their own, respectively.

A printing apparatus according to another aspect of the present invention, which can be connected with a pocket electric device through a network, includes a printing part printing out electric device related information including information which the pocket electric device has and information at a position on the network obtained based on information of the position on the network which the pocket electric device has, wherein the printing apparatus has environment information concerning environment in which the printing apparatus is installed, and, the printing apparatus adds the environment information to the above-mentioned electric device related information, and prints thereout.

Thereby, since the environment information of an environment in which the above-mentioned printing apparatus is installed is added to the information which a pocket electric device has, and it is printed out together at a time, it can be easily determined when and where the printed matter was obtained through the printing.

The above-mentioned printing apparatus may add further the individual identification information which the pocket electric device has built therein as internal information thereof to the above-mentioned electric device related information, and prints thereout together.

Thereby, since the individual identification information which the pocket electric device of a user has built therein as the internal information thereof is further added to the information which the pocket electric device (cellular phone) has and the environment information of the printing apparatus, and the resulting information is printed out by the printing apparatus at a time, it can be easily determined whether the printed matter is information of the above-mentioned user, and when many customers print out their information at the same store, they can easily distinguish which printed matters are their own, respectively, and, also, it can be easily determined when and where the printed matter was printed out.

Further, by configuring a printing system in which, through network connection, the above-mentioned pocket electric device and printing apparatus are connected with one another, the source of target information can be easily accessed through a network, such as the Internet, based on the position information concerning the source of target information registered into the pocket electric device (for example, the above-mentioned individual identification information), while printing apparatus is sharable by many electric devices, and required information can be always printed freely.

Other objects and further features of the present invention will become more apparent from the following detailed description when read in conjunction with the accompanying drawings.

BRIEF DESCRIPTION OF THE DRAWINGS

FIG. 7A shows an operation flow chart for illustrating a third printing operation in the printing system according to the present invention.

DETAILED DESCRIPTION OF THE PREFERRED EMBODIMENTS

Embodiments of the present invention will now be described with reference to figures.

Figure 1A:
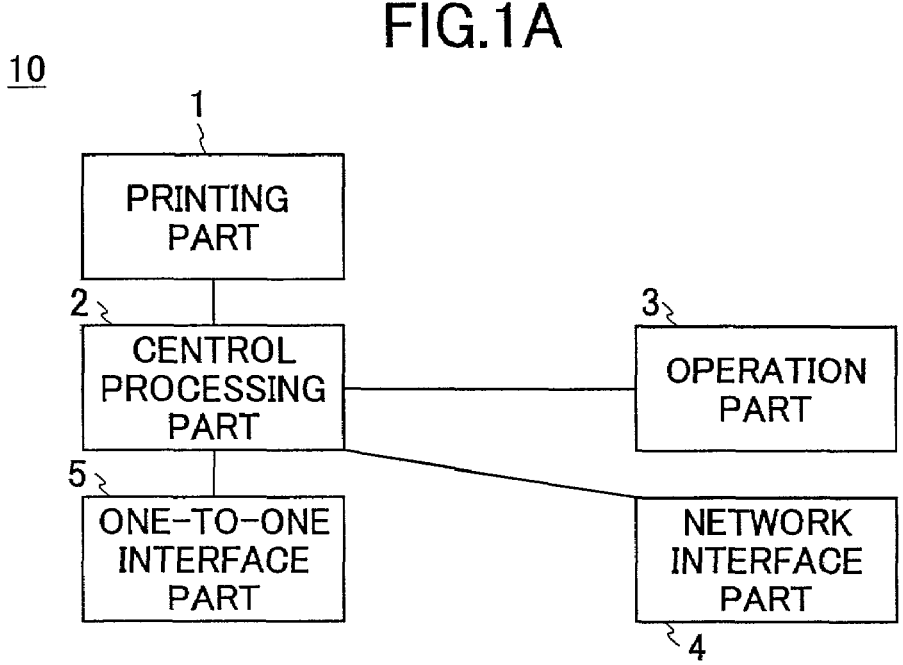
FIGS. 1A and 1B show embodiments of hardware configurations of printing apparatus according to the present invention.
Figure 1B:
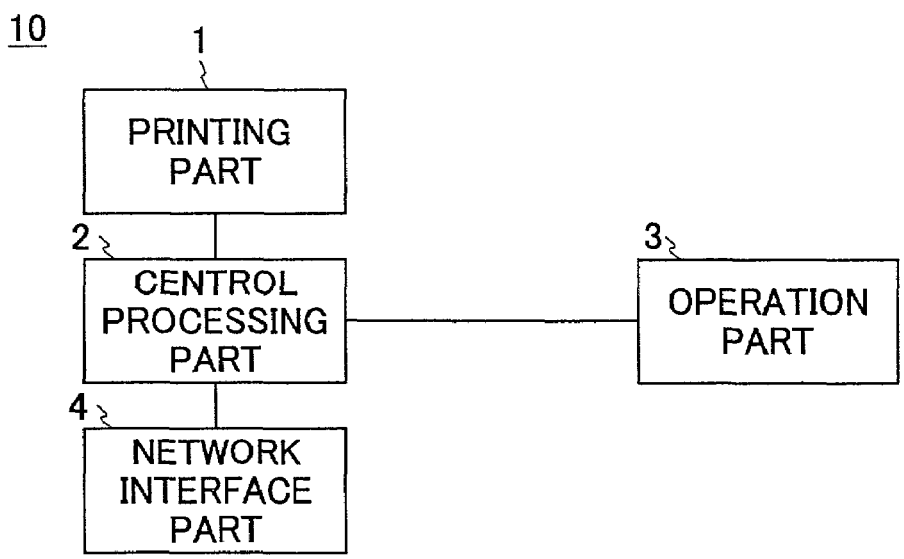

FIGS. 1A and 1B show two types of hardware configurations of printing apparatus 10 according to the present invention.

In FIG. 1A, in the printing apparatus 10, a printing part (one) has a function of notifying a user of a present printing number of sheets to a central processing part (2) while printing an image in response to receiving a printing processing demand and printing image data from a central processing part (2). The central processing part (2) holds environment information (an installation place, an address of the place, a name of the store/shop, the current date/time, and so forth) concerning the printing apparatus, and receives a demand from a user through an operation part (3). While issuing the printing processing demand to the printing part (1) and notifying the user of the state and warning concerning the printing apparatus if any, it is connected with a network such as the Internet through a network interface (4), and also it can communicate with another apparatus connected through the network. Furthermore, it is possible for this printing apparatus to communicate with another apparatus, such as a cellular phone or the like, by a one-to-one basis, through a one-to-one interface part (5).

The operation part (3) is connected with the central processing part (2), and the operation part (3) has a display function and an input function for user's operation (a "print" button, etc., for example).

The network interface part (4) has measures for connecting with the network, can therethrough perform transfer of information with another apparatus, such as another Office Automation (OA) apparatus or a cellular phone, and has a specific network identifier. Moreover, a demand from the central processing part (2) is sent out to the network, and information from the network is transferred to the central processing part (2).

The one-to-one interface part (5) is an interface for connecting with an apparatus, such as a cellular phone, in one-to-one basis. The one-to-one interface part (5) can convert a demand of the central processing part (2), and thus, send it to a cellular phone, etc., and also send a response from a cellular phone or the like to the central processing part (2).

FIG. 1B shows a hardware configuration of the printing apparatus 10 in another embodiment of the present invention, and it has the same configuration as that of the above-described embodiment shown in FIG. 1A except that the one-to-one interface part (5) is not included therein.

Figure 2A:
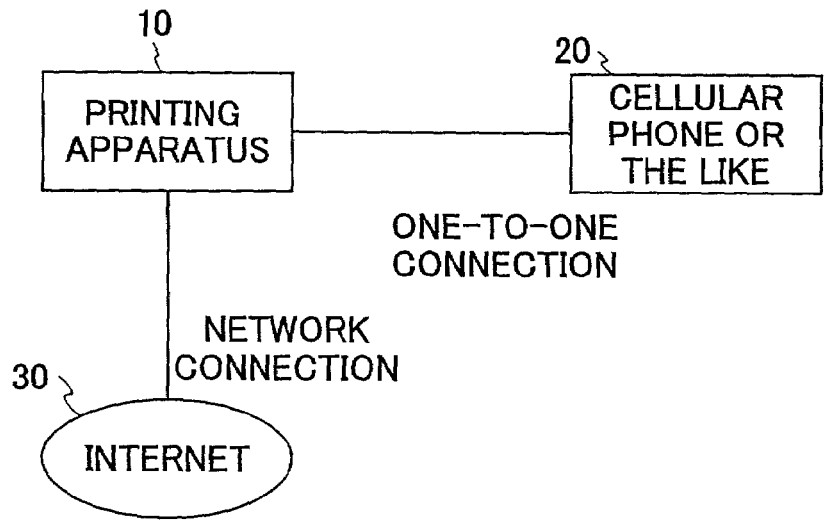
FIGS. 2A and 2B show embodiments of configurations of printing systems according to the present invention employing the printing apparatus shown in FIGS. 1A and 1B.
Figure 2B:
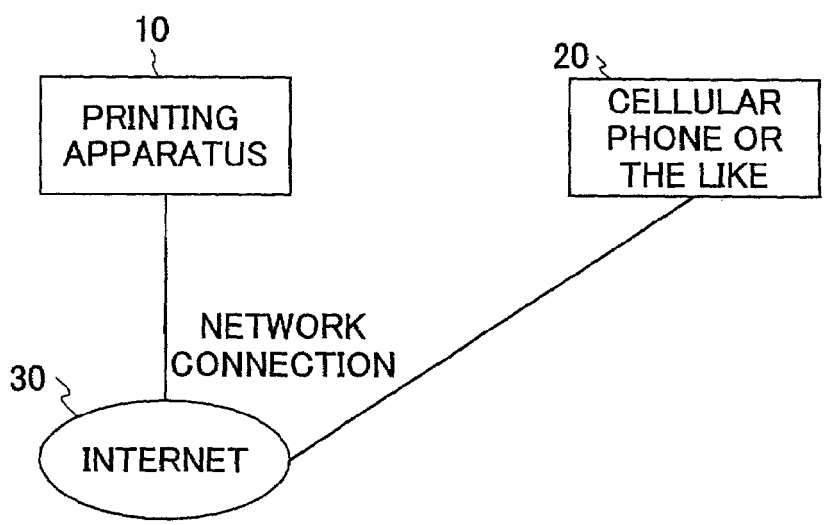

FIGS. 2A and 2B show configurations between Office Automation (OA) apparatuses in which the present invention operates, and actually, in which a plurality of personal computers, OA equipment and so forth are connected with each other.

FIG. 2A shows a configuration between OA apparatuses in a first embodiment, and the above-mentioned printing apparatus 10 connected to a network 30 such as the Internet, and a pocket electric device 20 such as a cellular phone are connected with one another in a one-to-one basis through a cable, for example.

FIG. 2B shows a configuration between OA apparatuses in a second embodiment of the present invention, and a pocket electric device 20, such as a cellular phone, is connected to the above-mentioned printing apparatus 10 through a network such as the Internet 30.

Figures 3, 4:
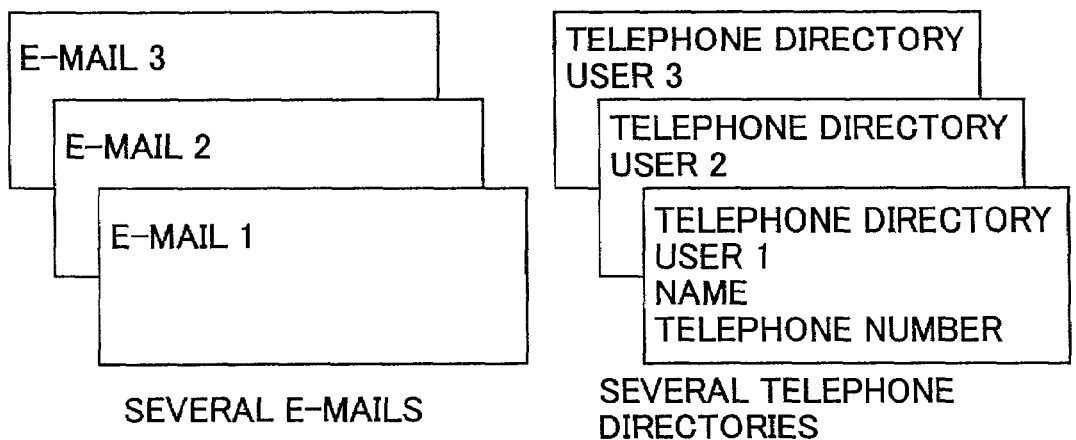
FIG. 3 shows information held by the printing apparatus according to the present invention.
FIG. 4 shows information held by a pocket electric device (cellular phone) according to the present invention.

FIG. 3 shows an example of information held by the above-mentioned printing apparatus 10. In this example, information, such as installation place information (for example, "the side of the cash register of a convenience store"), the address of this installation position, a name of this store, and printing date/time, is held by/stored in a memory of the printing apparatus 10.

FIG. 4 shows an example of information which is held by/stored in a memory of the cellular phone 20. In this example, e-mail information (e-mails 1 through 3), telephone directory information (telephone directory users 1 through 3), the own cellular-phone number, the own e-mail address, the cellular-phone owner name, etc. are held by the cellular phone 20.

Next, operation flows in cases of performing actual printing operation based on information held at the printing apparatus 10 explained above, pocket electric device 20, and each thereof will now be explained.

Figure 5A:
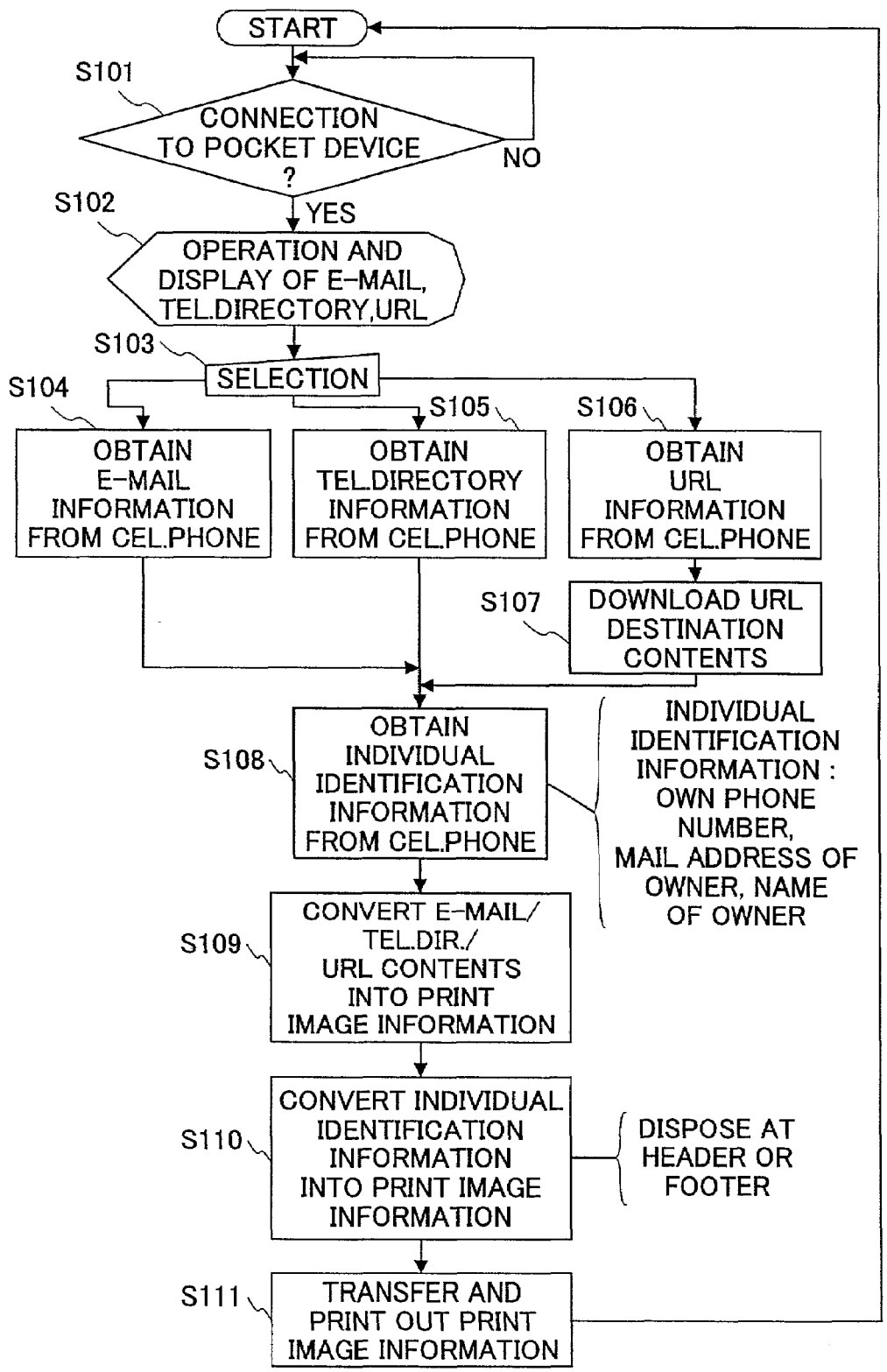
FIG. 5A shows an operation flow chart for illustrating a first printing operation in the printing system according to the present invention.

FIG. 5A shows a flow chart for illustrating a first processing procedure performed by the central processing part (2) of the printing apparatus 10 of each of the above-described embodiments of the present invention.

In a case (Yes of a step S101) where the central processing part (2) of the printing apparatus 10 is connected to the cellular phone 20 through the network interface part (4) or the one-to-one interface part (5), through operation of the operation part (3) (in a step S102) by a user, a type of information (e-mail information, telephone directory information or URL (uniform resource locator) information which shows the object (informational record place) on the Internet)) held at the cellular phone 20 is selected by the user (in a step S103). Then, for the selected type of information, through the network interface (4) or one-to-one interface (5), from the cellular phone 20, the e-main information (in a step S104), telephone directory information (in a step S105), or URL information (in a step S106) is obtained. Further, from the URL information, URL destination information (contents) is downloaded (in a step S107) in a case. Then, through the network interface (4) or one-to-one interface (5), from the cellular phone 20, individual identification information (own phone number, mail address of the owner of the phone, the name of the owner, and so forth) is obtained (in a step S108). Then, the thus-obtained e-mail information, telephone directory information, URL destination information, etc. is converted into printing image information (in a step S109). Furthermore, the individual identification information is also converted into printing image information (the individual identification information is disposed at a position of header or footer) (in a step S110). Furthermore, the thus-obtained image information of both items are overlapped, and is transferred to the printing part (1) which then prints out the transferred information (in a step S111).

Figure 5B:
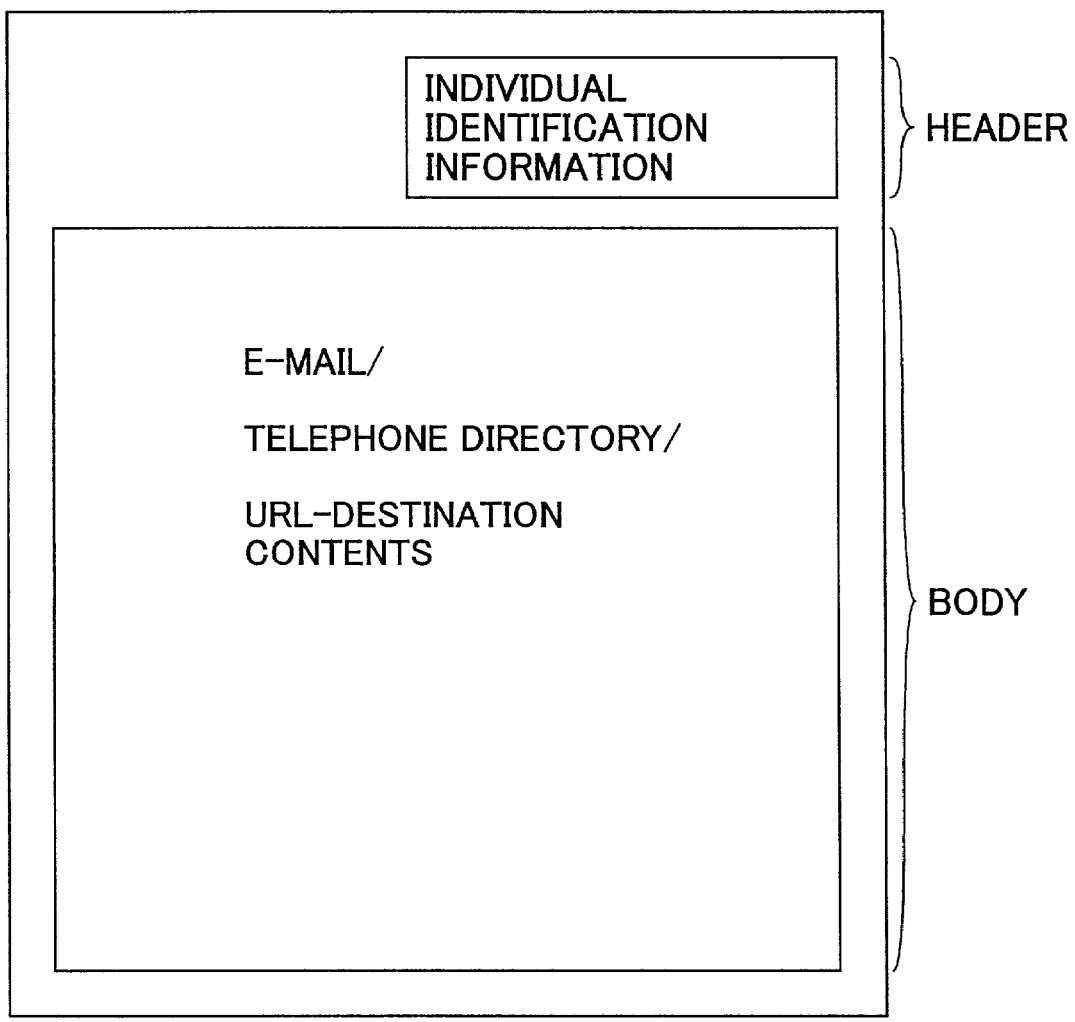
FIG. 5B shows an example of a printed matter obtained through printing of the operation shown in FIG. 5A.

Thereby, as shown in FIG. 5B, the individual identification information is printed out at a header, for example, together with body information such as e-mail information, telephone directory information or URL destination contents, at a time.

Figure 6A:
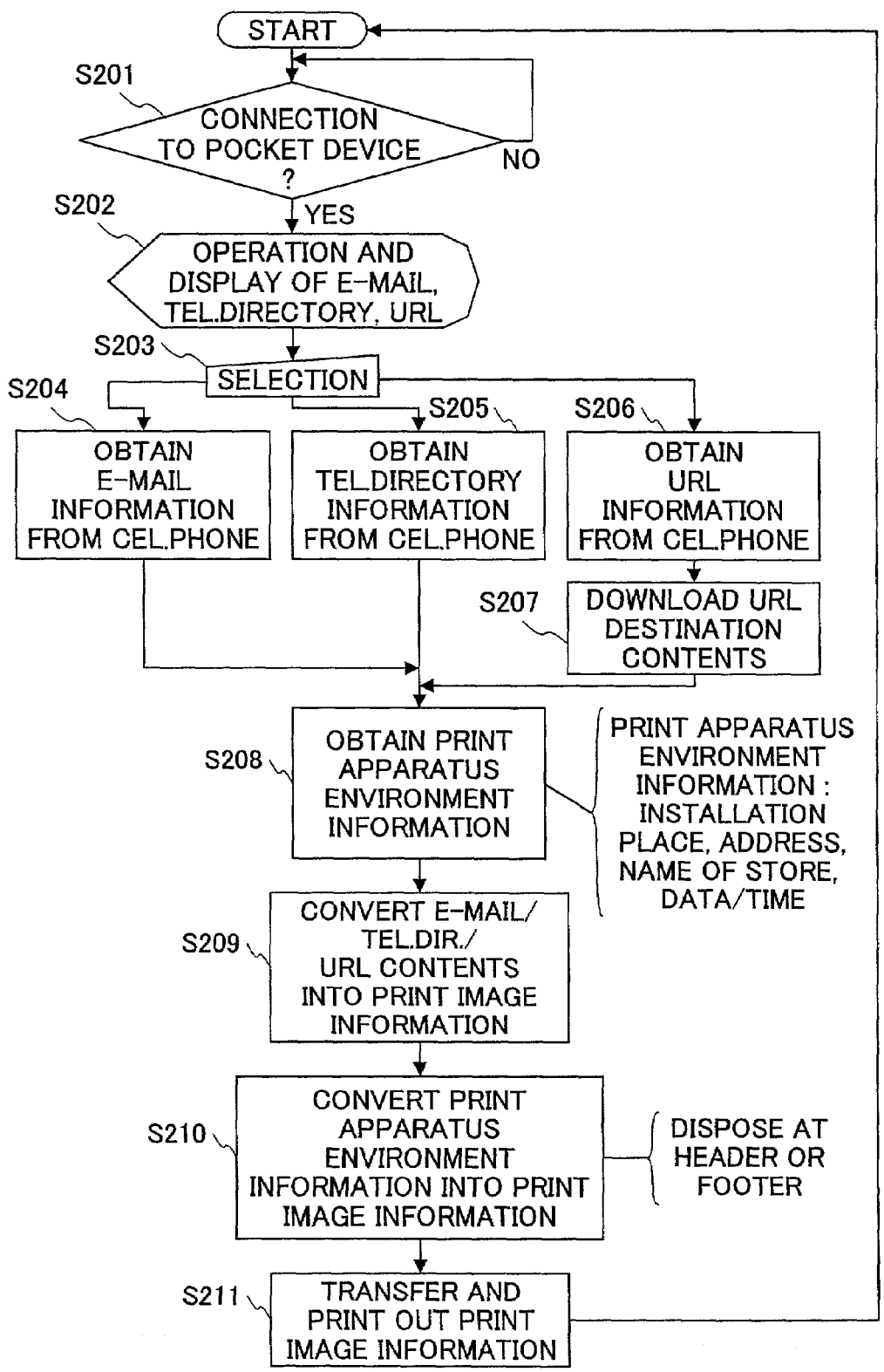
FIG. 6A shows an operation flow chart for illustrating a second printing operation in the printing system according to the present invention.

FIG. 6A shows a flow chart for illustrating a second processing procedure performed by the central processing part (2) of the printing apparatus 10 of each of the embodiments of the present invention.

In a case where the central processing part (2) of the printing apparatus 10 is connected to the cellular phone 20 through the network interface part (4) or the one-to-one interface part (5) (Yes in a step S201), through operation by a user and display on the operation part (3) for the user (in a step S202), a type of information (e-mail information, telephone directory information or URL information) held in the cellular phone is selected (in a step S203). Then, according to the selection, through the network interface (4) or the one-to-one interface (5), from the cellular phone 20, the e-main information (in a step S204), the telephone directory information (in a step S205) or the URL information (in a step S206) is obtained. Then, the URL destination contents is downloaded from the URL information (in a step S207) in a case. Then, environment information (the installation place, the address of the installation store, the name of the store, information of current date/time) concerning this printing apparatus 10 held by/stored in a memory of the printing apparatus 10 is obtained (in a step S208). Then, the thus-obtained e-mail information, the telephone directory information or the URL destination information, etc. is converted into printing image information (in a step S209). Further, the above-mentioned printing apparatus environment information obtained in the step S208 is further converted into printing image information (in a step S210), and, the obtained image information of both items (printing apparatus environment information and the body information (e-mail, telephone directory or URL destination contents, etc.)) are overlapped with one another, and is transferred to the printing part (1), which then prints out the thus-transferred information (in a step S211).

Figure 6B:
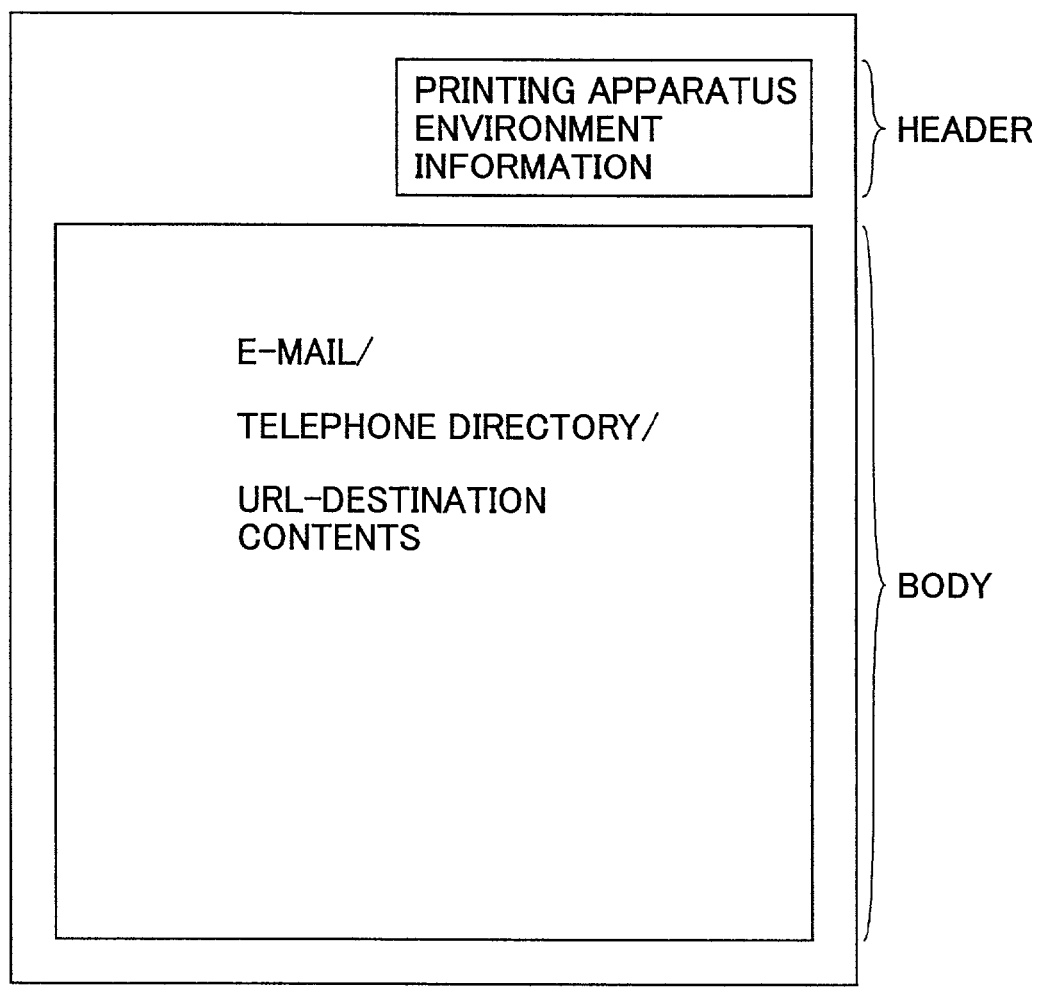
FIG. 6B shows an example of a printed matter obtained through printing of the operation shown in FIG. 6A.

Thereby, as shown in FIG. 6B, the printing apparatus environment information is printed out at a header, for example, together with body information such as e-mail information, telephone directory information or URL destination contents, etc.

FIG. 7A shows a flow chart for illustrating a third processing procedure performed by the central processing part (2) of the printing apparatus 10 of each of the above-described embodiments of the present invention.

In a case where the printing apparatus 10 is connected to the cellular phone 20 through the network interface part (4) or the one-to-one interface part (5), the central processing part (2) determines it (in a step S301), and, then, through an operation and display on the operation part (3) (in a step S302), a type of information (e-mail information, the telephone directory information or the URL information) held in the cellular phone is selected (in a step S303). Then, according to the selection, through the network interface (4) or the one-to-one interface (5), from the cellular phone, the e-main information (in a step S304), the telephone directory information (in a step S305), or the URL information (in a step S306) is obtained. Then, URL destination contents is downloaded from the URL information (in a step S307) in a case. Then, through the network interface (4) or the one-to-one interface (5), the individual identification information (own phone number, mail address of the owner, the name of the owner and so forth) is obtained from the cellular phone (in a step S308). Then, the environment information (the installation place, the address of the store, the name of the store, information of current date/time) of this printing apparatus held at the printing apparatus is obtained (in a step S309). Then, the thus-obtained e-mail information, the telephone directory information, or the URL destination contents information, etc. is converted into printing image information (in a step S310). Furthermore, the individual identification information and printing apparatus environment information are also converted into printing image information (in a step S311). At this time, the individual identification information and printing apparatus environment information are disposed in position of header or footer. Then, the thus-obtained image information of the three sorts (individual identification information, printing apparatus environment information and body information) are overlapped with each other, and is transferred to the printing part (1), which then prints out the transferred information (in a step S312).

Figure 7B:
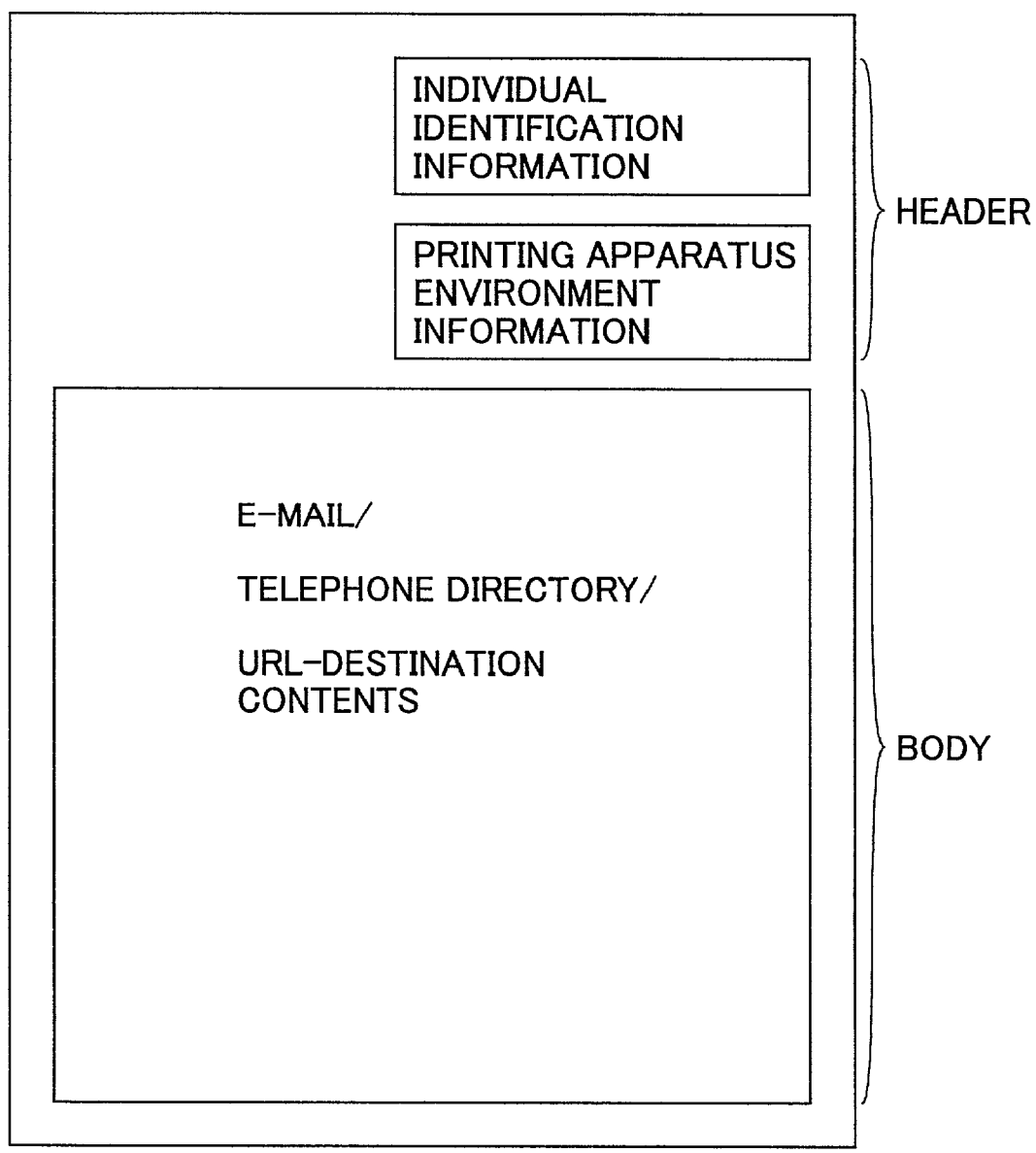
FIG. 7B shows an example of a printed matter obtained through printing of the operation shown in FIG. 7A.

Thereby, as shown in FIG. 7B, the individual identification information and printing apparatus environment information are printed out at a header, for example, together with body information such as e-mail information, telephone directory information or URL destination contents at a time.

As described above, according to the present invention, information required can always freely be printed out using information held at a pocket electric device by making network connection of the pocket electric device with the printing apparatus.

Further, the present invention is not limited to the above-described embodiments, and variations and modifications may be made without departing from the scope of the present invention.

The present application is based on Japanese priority application No. 2000-274834, filed on Sep. 11, 2000, the entire contents of which are hereby incorporated by reference.

What is claimed is:

1. A printing apparatus for connecting with a pocket electric device through a network, said printing apparatus comprising a printing part printing out electric device related information including information stored in the pocket electric device and information from the network obtained based on location information stored in the pocket electric device,
   wherein said printing apparatus adds owner identification information specific to the pocket electric device and stored internally in the pocket electric device to the electric device related information, and prints the owner identification information and the electric device related information together, and
   wherein the adding of the owner identification information and printing thereof with the electric device related information are carried out through conversion of the owner identification information into print image information.

2. A printing apparatus for connecting with a pocket electric device through a network, said printing apparatus comprising a printing part printing out electric device related information including at least one of information stored in the pocket electric device and information from the network obtained based on location information stored in the pocket electric device,
   wherein said printing apparatus has environment information concerning an environment in which said printing apparatus is installed, and, said printing apparatus adds the environment information to the electric device related information, and prints the environment information and the electric device related information together, and
   wherein the adding of the environment information and printing thereof together with the electric device related information are carried out through conversion of the environment information into print image information.

3. The printing apparatus as claimed in claim 2, wherein:
   said printing apparatus adds further owner identification information specific to the pocket electric device and stored internally in the pocket electric device, and prints the owner identification information together with the electric device related information and environment information.

4. A printing system in which the printing apparatus claimed in claim 1 is connected with the pocket electric device through the network.

5. A printing system in which the printing apparatus claimed in claim 2 is connected with the pocket electric device through the network.

6. A printing system in which the printing apparatus claimed in claim 3 is connected with the pocket electric device through the network.

7. A printing apparatus for connecting with a pocket electric device through a network, said printing apparatus comprising:
   printing means for printing out electric device related information including at least one of information stored in the pocket electric device and information from the network obtained based on location information stored in the pocket electric device; and
   adding means for adding owner identification information specific to the pocket electric device and stored internally in the pocket electric device to the electric device related information before it is printed out by said printing means,
   wherein the adding of the owner identification information and printing of the owner identification information together with the electric device related information are carried out through conversion of the owner identification information into print image information.

8. A printing apparatus for connecting with a pocket electric device through a network, said printing apparatus comprising:
   printing means for printing out electric device related information including at least one of information stored in the pocket electric device and information from the network obtained based on location information stored in the pocket electric device; and
   adding means for adding environment information to the electric device related information, before it is printed out by said printing means,
   wherein said printing apparatus has the environment information concerning an environment in which said printing apparatus is installed, and
   wherein the adding of the environment information and printing of the environment information together with the electric device related information are carried out through conversion of the environment information into print image information.

9. The printing apparatus as claimed in claim 8, wherein:
   said adding means adds further owner identification information specific to the pocket electric device and stored internally in the pocket electric device to the electric device related information before it is printed out by said printing means together with the environment information.

10. A printing system in which the printing apparatus claimed in claim 7 is connected with the pocket electric device through the network.

11. A printing system in which the printing apparatus claimed in claim 8 is connected with the pocket electric device through the network.

12. A printing system in which the printing apparatus claimed in claim 9 is connected with the pocket electric device through the network.

13. A printing apparatus for connecting with a pocket electric device through a network, said printing apparatus comprising a printing part printing out electric device related information including information stored in the pocket electric device and information from the network obtained based on location information stored in the pocket electric device,
   wherein said printing apparatus adds owner identification information specific to the pocket electric device and stored internally in that the pocket electric device to the electric device related information, and prints the owner identification information and the electric device related information together, wherein the adding of the owner identification information and printing thereof with the electric device related information are carried out through conversion of the owner identification information into print image information, wherein said printing apparatus has environment information concerning an environment in which said printing apparatus is installed, and, said printing apparatus adds the environment information to the electric device related information, and prints the environment information and the electric device related information together, and wherein the adding of the environment information and printing thereof together with the electric device related information are carried out through conversion of the environment information into print image information.

14. The printing apparatus as claimed in claim 13, wherein the printing part is configured to print the owner identification information and the environment information at a header part.

15. A printing apparatus for connecting with a pocket electric device through a network, said printing apparatus comprising:

printing means for printing out electric device related information including at least one of information stored in the pocket electric device and information from the network obtained based on location information stored in the pocket electric device; and adding means for adding owner identification information specific to the pocket electric device and stored internally in the pocket electric device to the electric device related information before it is printed out by said printing means, wherein the adding of the owner identification information and printing thereof with the electric device related information are carried out through conversion of the owner identification information into print image information; and adding means for adding environment information to the electric device related information, before it is printed out by said printing means, wherein said printing apparatus has the environment information concerning an environment in which said printing apparatus is installed, and wherein the adding of the environment information and printing thereof together with the electric device related information are carried out through conversion of the environment information into print image information.

16. The printing apparatus as claimed in claim 15, wherein the printing means is configured to print the owner identification information and the environment information at a header part.

* * * * *